US005536019A

United States Patent [19]

Bryant et al.

[11] Patent Number: 5,536,019

[45] Date of Patent: Jul. 16, 1996

[54] LIGHT UNIT HAVING A SEALING MEMBER FOR A LIGHT BULB CONTAINING PRESSURE RELIEF MEANS

[75] Inventors: Peter D. Bryant; Robert F. Tolley; David A. Birt, all of Staffordshire, England

[73] Assignee: Magneti Marelli UK Limited, Staffordshire, England

[21] Appl. No.: 370,601

[22] Filed: Jan. 10, 1995

[30] Foreign Application Priority Data

Nov. 4, 1994 [GB] United Kingdom .................. 9422253

[51] Int. Cl.[6] .............................. F16J 15/00; F21V 29/00

[52] U.S. Cl. ..................... 277/29; 277/212 FB; 362/218; 362/267; 362/294

[58] Field of Search ............................... 277/212 FB, 29, 277/208, 212 R, 212 C, 237 A; 362/226, 267, 373, 294, 218, 458

[56] References Cited

U.S. PATENT DOCUMENTS

| | | | |
|---|---|---|---|
| 1,900,539 | 3/1933 | Brady | 362/294 |
| 2,016,474 | 10/1935 | Wood | 362/294 |
| 2,318,211 | 5/1943 | Hicks | 362/294 |
| 4,003,667 | 1/1977 | Gaines et al. | 277/212 FB |
| 5,010,453 | 4/1991 | Ketterman | 362/61 |
| 5,113,320 | 5/1992 | Haydu | 362/373 |
| 5,442,525 | 8/1995 | Tsukada | 362/267 |
| 5,465,025 | 11/1995 | Hendrickson | 362/226 |

FOREIGN PATENT DOCUMENTS

| | | | |
|---|---|---|---|
| 1181014 | 11/1964 | Germany | 277/212 FB |
| 2405603 | 8/1975 | Germany | 362/226 |
| 45-24726 | 1/1965 | Japan | 277/212 FB |

*Primary Examiner*—William A. Cuchlinski, Jr.
*Assistant Examiner*—John L. Beres
*Attorney, Agent, or Firm*—Trexler, Bushnell, Giangiorgi & Blackstone, Ltd.

[57] ABSTRACT

A sealing member in the form of an elastomeric cap serves to seal the joint between a reflector body and a light bulb which is inserted into the back of the reflector body. To enable breathing of the lamp unit, the sealing cap is formed of a resilient, elastomeric material and has a normally closed slit therethrough.

7 Claims, 2 Drawing Sheets

Figure 1:
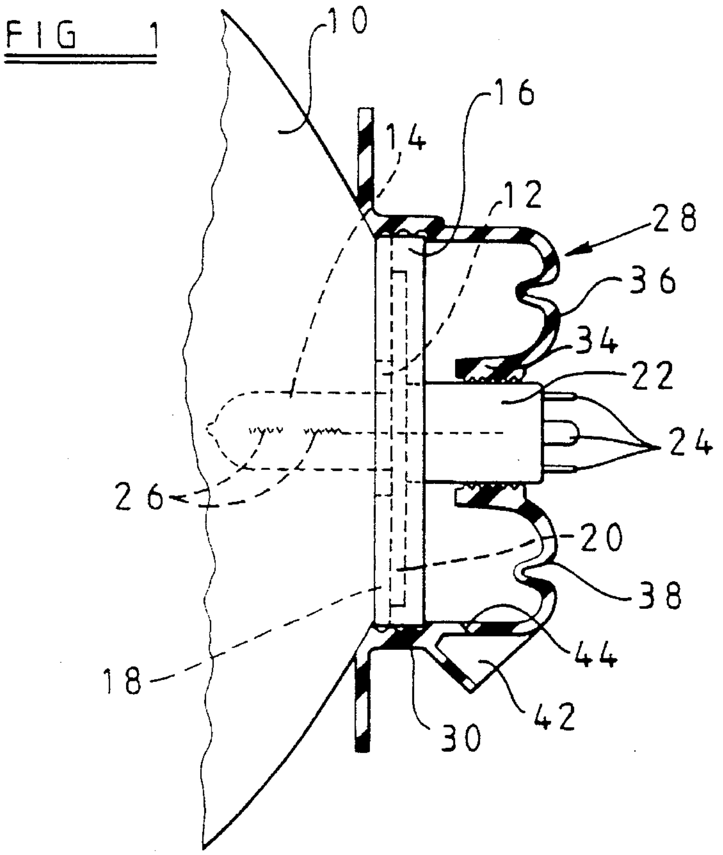

LIGHT UNIT HAVING A SEALING MEMBER FOR A LIGHT BULB CONTAINING PRESSURE RELIEF MEANS

This invention relates to a sealing member for a lamp unit, particularly, but not exclusively, a lamp unit having a rear opening for receiving a light source such as a light bulb, such as a motor vehicle lamp unit eg headlamp, fog lamp or spot lamp.

In high-intensity motor vehicle lamp units such as headlamps, spot lamps and fog lamps, the lamp unit comprises a dished reflector body which is sealed at the front by a transparent front cover and which has a rear opening for receiving the light source such as a light bulb, more usually a quartz halogen light bulb. A sealing cap is provided which has a wall formed of a resilient elastomeric material such as synthetic rubber and which is adapted to seal around the rear opening. Usually, sealing takes place against a bulb-receiving sleeve surrounding the rear opening. The sealing cap itself also has a sleeve which seals against a projecting body of the light source. With such a high-intensity lamp unit, it is also necessary to allow the lamp unit to breathe. This is because, when the light source is energised, the temperature within the lamp unit rises considerably, thus increasing the internal air pressure within the lamp unit. This pressure is relieved by venting the lamp unit to atmosphere via a breather. Likewise, when the light source is de-energised, the resultant decrease in temperature within the lamp unit causes the air pressure to decrease so allowing air to be drawn into the lamp unit through the breather. However, it is important that dirt and spray water should not be permitted to enter the lamp unit in service. Thus, many different designs of breather are known which permit the lamp unit to breathe but which prevent dirt and spray water entering the lamp unit. In one type of breather, a relatively large passage of convoluted shape is provided with intermediate lower drain holes. In other designs, the breather includes a chimney which promotes breathing of the lamp unit.

Some of these lamp units have a dished housing sealed by the transparent front cover. In such cases, the reflector and light bulb are often disposed wholly within the housing ,and the breather is associated with the housing rather than being mounted on the reflector itself. The present invention is applicable to both types of lamp unit.

Whilst the above-described breathers operate in general satisfactorily to exclude dirt and spray water, they do not provide adequate protection on occasions where the lamp unit becomes totally submerged in water for a short period of time such as might occur when the vehicle has to traverse a flood, pool, river or other relatively deep water.

It is an object of the present invention to provide an improved sealing member for a lamp unit.

According to one aspect of the present invention, there is provided a sealing member for sealing a lamp unit, said sealing member having a breather through which air can pass to enable air to enter and leave the lamp unit in use, wherein the breather comprises a slit formed in a resilient, elastomeric region of the sealing member, said slit extending completely through the sealing member.

The slit, being formed by a cut in the resilient, elastomeric region of the sealing member, is normally closed, i.e. in the relaxed state of such region the sides of the slit are sealed against one another.

Preferably, the sealing member includes a folded region or the like to enable small internal pressure changes to take place by deformation of the folded region without opening of the slit.

The slit may be provided in an upper region (e.g. the top) of the sealing member, it is preferred for such slit to be formed in a lower region thereof (more preferably the bottom) and to be protected by a downwardly and rearwardly projecting wall extending from an exterior surface of the member at least partly around the slit.

The terms "upper", "top", "lower", "bottom", "downwardly" and "rearwardly" refer to the arrangement of the respective parts when the sealing member is in an orientation corresponding to its orientation in use on the lamp unit.

Preferably, the sealing member is completely formed of the resilient, elastomeric material.

In one embodiment, the sealing member takes the form of a sealing cap for a lamp unit having a rear opening for receiving a light source, said sealing cap having (a) a wall which is adapted to seal against the lamp unit around said rear opening, and (b) a sleeve which is adapted to seal against a projecting portion of the light source.

In a preferred embodiment, the sealing cap includes at least one folded region between the sleeve and the wall, such folded region permitting expansion and contraction of the sealing cap whilst maintaining the seal around the rear opening and against the light source. This enables relatively small volume changes within the lamp unit to be accommodated without the need for breathing to occur through the slit.

The slit is preferably formed at an angle to a perpendicular to that region of the material of the sealing member in which the slit is formed. The slit preferably extends transversely with respect to a longitudinal axis of the wall of the sealing cap.

It is to be appreciated that the nature of the resilient, elastomeric material, the thickness thereof in the region of the slit, and the length of the slit can be appropriately selected to obtain the required sealing effect against immersion in water having regard to the particular size, design and light output of the lamp unit. However, typically, for a vehicle headlamp unit, the material may be an ethylene-propylene-diene monomer (EPDM) ternary copolymer rubber having a thickness of 2.5 mm in the region of the slit, with the slit having a length of 6 to 8 mm, preferably 7 mm.

According to a second aspect of the present invention, there is provided a lamp unit when fitted with a sealing member according to said one aspect of the present invention.

Figure 2:
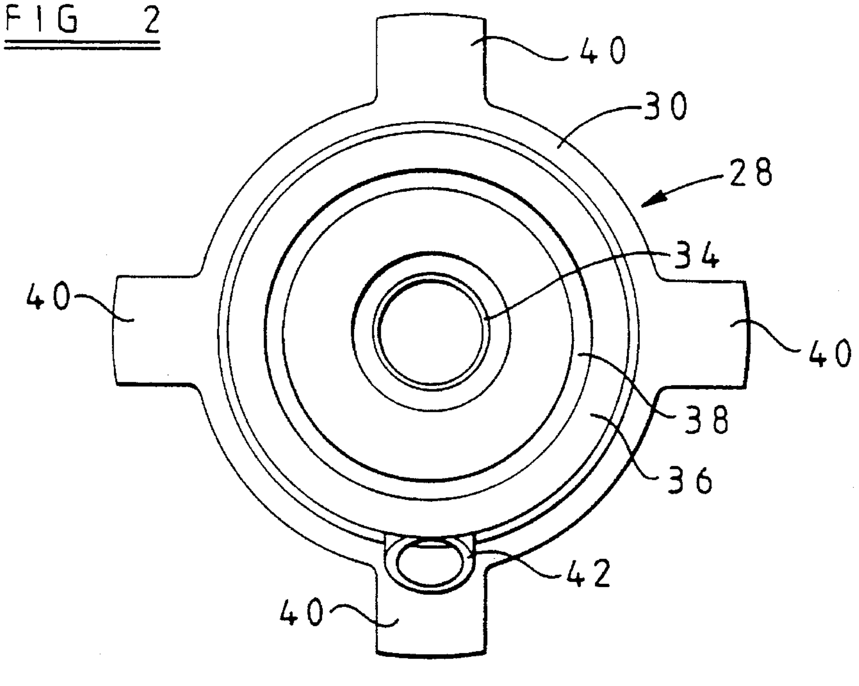
Figure 3:
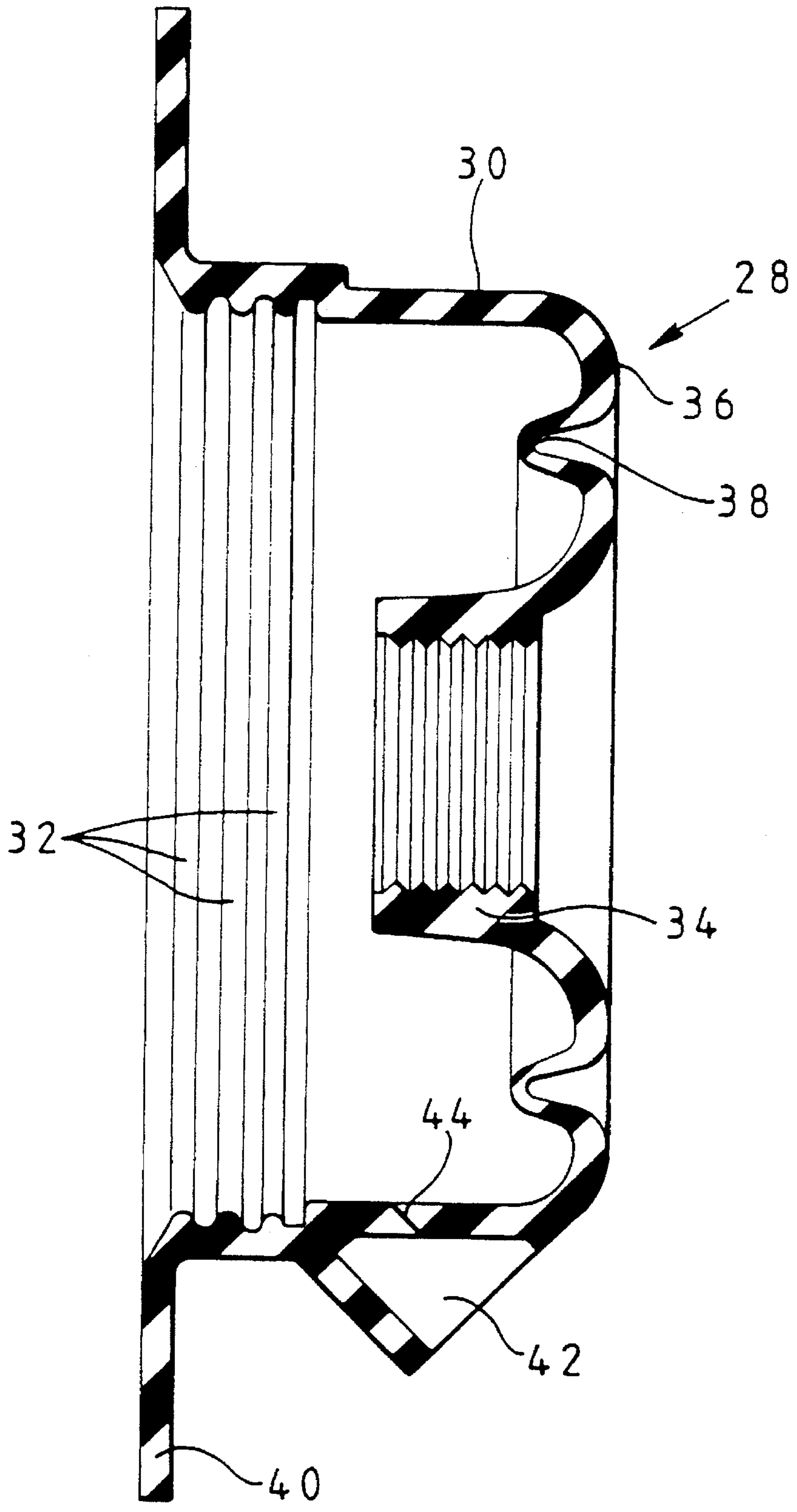

An embodiment of the present invention will now be described, by way of example, with reference to the accompanying drawings, in which:

FIG. 1 is a schematic illustration showing the rear part of a motor vehicle headlamp reflector fitted with a sealing cap in a lamp unit according to the present invention, FIG. 2 is a rear view of the sealing cap illustrated in FIG. 1, and FIG. 3 is an axial section, on a larger scale, of the sealing cap illustrated in FIGS. 1 and 2.

Referring now to the drawings, the motor vehicle headlamp reflector comprises a dished reflector body 10 having a front opening (not shown) which is closed in a sealed fashion by a transparent front cover (also not shown). The reflector body 10 has a rear opening 12 which receives a light bulb 14. An annular sleeve 16 extends rearwardly from the reflector body 10 and surrounds the rear opening 12. An annular mounting surface 18 within the sleeve 16 serves to support a mounting flange 20 of the light bulb 14 so that a body 22 of the light bulb 14 is disposed externally of the reflector body 10. The body 22 carries electrical supply terminals 24 for feeding current to filaments 26 within the light bulb 14.

A sealing cap 28 serves to seal the joint between the reflector body 10 and the light bulb 14. The sealing cap 28 is moulded as a single piece from a suitable resilient, elastomeric material, for example EPDM rubber, and comprises an outer annular wall 30 having internal annular ribs 32 which are of a size to be engaged frictionally with the outer periphery of the sleeve 16 whereby to seal against the latter. The sealing cap further comprises a central internal annular sleeve 34 whose internal surface has annular ribs for sealing engagement around the body 22 of the light bulb 14. The wall 30 and sleeve 34 are integrally jointed by means of a joining region 36 having an annular fold 38 therein approximately mid-way between the sleeve 34 and the wall 30. The wall 30 has a series of four tongues 40 extending radially outwardly from its open end, i.e. that end which is opposite to the joining region 36. The tongues 40 facilitate fitting and removal of the sealing cap 28.

The sealing cap 28 is also moulded with a localised short curved wall 42 which is disposed at the bottom of the wall 30 and which extends downwardly and rearwardly at an angle of 45° to the common longitudinal axis of the wall 30 and sleeve 34.

The sealing cap 28 is provided with a breather in the form of a normally closed slit 44 which is formed by means of a thin cutting blade. The slit 44 extends completely through the wall 30 within the localised curved wall 42. The slit 44, in this embodiment, extends in the peripheral direction of the wall 30 for a distance of about 7 mm. The slit 44 is, furthermore, inclined at an angle of 45° to the perpendicular so that it extends substantially in the axial direction of the localised curved wall 42. Apart from the provision of the slit 44, the whole assembly of reflector body 10, bulb 14, transparent front cover and sealing cap 28 is completely sealed against ingress of air when the sealing cap 28 is fitted.

When the bulb 14 is energised, heating of the air within the reflector body 10 takes place with a resultant increase in internal air pressure. For only small increases in internal air pressure, the sealing cap 28 can expand by virtue of the provision of the fold 38 with the slit 44 remaining closed. However, upon further increase in internal pressure, the slit 44 opens up and allows air to escape to atmosphere, following which the slit 44 promptly closes to re-seal the assembly.

Even when the light bulb is energised, small internal air pressure drops can occur if the illuminated lamp becomes briefly immersed in water when the vehicle is traversing relatively deep water, such small pressure drops are accommodated for by deformation of the material of the cap in the region of the fold 38 so that opening of the slit 44 is avoided under these conditions.

Upon de-energisation of the light bulb and subsequent substantial cooling of the air within the reflector body 10, a sufficient drop in internal air pressure can cause the slit 44 to open to admit air into the reflector body momentarily before re-sealing takes place.

Since opening of the slit 44 only occurs under conditions of substantial pressure change and for a relatively short period of time, the whole assembly is effectively sealed for most of the time against ingress of dirt and water but still permits breathing to take place to avoid a damagingly high differential pressure build-up between the inside and the outside of the lamp unit.

The localised wall 42 prevents water from being sprayed directly against the slit 44 during normal forward progress of the vehicle and so reduces the risk of leakage of water under pressure through the slit 44.

In a typical example, the sealing cap is formed of an EPDM polymer having a Shore hardness of 58, a tensile strength of 9.41 MPa, and elongation of 450% and a compression set of 34.2%. After heat-ageing for 70 hours at 100° C., the Shore hardness increases only to 59, the tensile strength is 93.2% of the original, the elongation is 85% of the original and the insulation resistance below −40° C. is greater than 2 megohms.

We claim:

1. A lamp unit comprising a dished body; means defining a front opening in said dished body; means defining a rear opening in said dished body; a sleeve surrounding said rear opening and extending rearwardly of said dished body; a light source mounted in said rear opening, said light source having a light source body; and a sealing member, said sealing member having an outer wall which is sealingly engaged with said sleeve, an inner sleeve which is sealingly engaged with said light source body, a resilient elastomeric region, and a breather through which air can pass to enable air to enter and leave said dished body, said breather comprising a normally closed slit in said resilient elastomeric region and extending completely through said sealing member.

2. A lamp unit according to claim 1, wherein said sealing member includes a folded region to enable small internal pressure changes to take place by deformation of the folded region without opening of the normally closed slit.

3. A lamp unit according to claim 1, wherein the normally closed slit is provided in an upper region of the sealing member.

4. A lamp unit according to claim 1, wherein the normally closed slit is formed in a lower region of the sealing member and is protected by a downwardly and rearwardly projecting wall extending from an exterior surface of the member at least partly around the normally closed slit.

5. A lamp unit according to claim 1, wherein said sealing member is completely formed of the resilient, elastomeric material.

6. A lamp unit according to claim 1, wherein the sealing member includes at least one folded region between the sleeve and the wall, such folded region permitting expansion and contraction of the sealing member whilst maintaining the seal around the rear opening and against the light source.

7. A lamp unit according to claim 1, wherein the normally closed slit is formed at a diagonal angle to that region of the material of the sealing member in which the slit is formed.

* * * * *